(12) United States Patent
Chen et al.

(10) Patent No.: US 10,797,505 B2
(45) Date of Patent: Oct. 6, 2020

(54) WIRELESS CHARGING GUIDE SYSTEM, WIRELESS CHARGING GUIDE METHOD AND WIRELESS CHARGING GUIDE DEVICE

(71) Applicants: QISDA (SUZHOU) CO., Ltd.; Qisda Corporation, Taoyuan (TW)

(72) Inventors: Min-Jye Chen, Taoyuan (TW); Min-An Kuo, Hsinchu (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 534 days.

(21) Appl. No.: 15/426,075

(22) Filed: Feb. 7, 2017

(65) Prior Publication Data
US 2018/0226827 A1    Aug. 9, 2018

(51) Int. Cl.
*H02J 7/00*    (2006.01)
*H02J 7/02*    (2016.01)
(Continued)

(52) U.S. Cl.
CPC ............ *H02J 7/025* (2013.01); *H02J 7/0042* (2013.01); *H02J 7/027* (2013.01); *H02J 50/00* (2016.02); *H02J 50/10* (2016.02); *Y02B 40/90* (2013.01)

(58) Field of Classification Search
CPC ... A61B 6/4405; A61B 2562/16; A61B 6/032; Y02D 70/00; Y02D 70/142; G01P 3/44; H02J 50/10; H02J 7/025; H02J 7/345; H02J 7/00; H02J 7/0044; H02J 7/0047; H02J 7/0048; H02J 7/0063; H02J 7/0068; H02J 50/40; H02J 50/60; H02J 50/90; H02J 50/00; H02J 7/0042; H02J 7/027; A63B 2225/50; A63B 24/0062; A63B 60/46
(Continued)

(56) References Cited

U.S. PATENT DOCUMENTS

2003/0222148 A1 *   12/2003   Schmidt ............ G06K 7/10881
                                                                    235/462.45
2009/0230777 A1      9/2009   Baarman et al.
(Continued)

FOREIGN PATENT DOCUMENTS

CN          102769318 A      11/2012
CN          105278618         1/2016
(Continued)

OTHER PUBLICATIONS

Office action of counterpart application by Taiwan IP Office dated Sep. 1, 2016.
(Continued)

*Primary Examiner* — Binh C Tat (57) ABSTRACT

A wireless charging guide system includes a wireless charging cradle, an electronic device and a visual guide medium. The electronic device includes a power storage unit and a charging unit. When the visual guide medium guides the electronic device to be placed at a first position on the top surface of the wireless charging cradle, the charging unit, with respect to the wireless charging cradle, has a charging rate larger than a first default value and starts to charge the power storage unit, wherein the visual guide medium is accessed from a remote server according to the model of the electronic device.

17 Claims, 6 Drawing Sheets

(51) Int. Cl.
*H02J 50/00* (2016.01)
*H02J 50/10* (2016.01)

(58) Field of Classification Search
USPC .................................................. 320/106–115
See application file for complete search history.

(56) References Cited

U.S. PATENT DOCUMENTS

| | | | | |
|---|---|---|---|---|
| 2012/0157073 | A1* | 6/2012 | Kim | G06F 1/1626 |
| | | | | 455/418 |
| 2012/0319645 | A1* | 12/2012 | O'Donnell | H02J 7/025 |
| | | | | 320/108 |
| 2013/0307468 | A1* | 11/2013 | Lee | H02J 7/0052 |
| | | | | 320/108 |
| 2014/0002013 | A1 | 1/2014 | Kossi et al. | |
| 2014/0347008 | A1* | 11/2014 | Chae | H02J 7/025 |
| | | | | 320/108 |
| 2015/0303706 | A1 | 10/2015 | Bronson et al. | |
| 2016/0027399 | A1 | 1/2016 | Wilde et al. | |

FOREIGN PATENT DOCUMENTS

| | | |
|---|---|---|
| TW | M381217 | 5/2010 |
| TW | 201502969 A | 1/2015 |
| TW | 201532363 A | 8/2015 |

OTHER PUBLICATIONS

Office action of counterpart application by SIPO dated Mar. 28, 2018.
Office action of counterpart application by SIPO of PROC dated Jan. 3, 2019.

* cited by examiner

WIRELESS CHARGING GUIDE SYSTEM, WIRELESS CHARGING GUIDE METHOD AND WIRELESS CHARGING GUIDE DEVICE

This application claims the benefit of Taiwan application Serial No. 105107794, filed Mar. 14, 2016, the subject matter of which is incorporated herein by reference.

BACKGROUND OF THE INVENTION

Field of the Invention

The invention relates in general to a charging system, and more particularly to a wireless charging guide system, a wireless charging guide method and a wireless charging guide device.

Description of the Related Art

The wireless charging technique, which achieves charging effect according to the electromagnetic theory, can complete the charging of an electronic device without using any wires or adaptors, hence increasing the convenience of the electronic device. Therefore, the wireless charging technique has become a prominent technique in the industries.

In order to increase the charging efficiency, the electronic device needs to be precisely aligned with a charging position on a wireless charger. However, the first-time user normally cannot obtain the correct charging position and therefore can only randomly move the electronic device to locate a possible charging position. At each time of charging, a certain amount of time will be wasted in determining the charging position, and the charging efficiency will be affected if the correct charging position cannot be located precisely and quickly.

SUMMARY OF THE INVENTION

The invention is directed to a wireless charging guide system, a guide method and a guide device capable of quickly locating a correct charging position through visual guidance to increase the charging efficiency.

According to one embodiment of the present invention, a wireless charging guide system is provided. The wireless charging guide system includes a wireless charging cradle, an electronic device and a visual guide medium. The electronic device includes a power storage unit and a charging unit. When the visual guide medium guides the electronic device to be placed at a first position on the top surface of the wireless charging cradle, the charging unit, with respect to the wireless charging cradle, has a charging rate larger than a first default value and starts to charge the power storage unit, wherein the visual guide medium is accessed from a remote server according to the model of the electronic device.

According to another embodiment of the present invention, a wireless charging guide device of an electronic device is provided. The electronic device includes a power storage unit and a charging unit. The guide device includes a wireless charging cradle and a visual guide medium. The visual guide medium includes a set of numbers disposed on the top surface of the wireless charging cradle for guiding the electronic device to be placed on the wireless charging cradle. When the area of the set of numbers being shielded the electronic device defines a first position, the charging unit, with respect to the wireless charging cradle, has a charging rate larger than a first default value and starts to charge the power storage unit.

According to an alternate embodiment of the present invention, a wireless charging guide system is provided. The wireless charging guide system includes a wireless charging cradle, an electronic device and a light emitter. The electronic device includes a power storage unit, a charging unit and a monitor. The monitor displays an image pattern having a mark. The light emitter is for projecting a light spot on the top surface of the wireless charging cradle, wherein when the light spot is projected on the mark of the monitor and the electronic device is placed on the top surface of the wireless charging cradle, the wireless charging cradle charges the power storage unit through the charging unit.

According to an alternate embodiment of the present invention, a wireless charging guide method comprises the following steps: disposing an electronic device comprising a power storage unit and a charging unit at a first position on a top surface of a wireless charging cradle using a visual guide medium; and charging the power storage unit when a charging unit, with respect to the wireless charging cradle, has a charging rate larger than a first default value, wherein the electronic device accesses the visual guide medium from the remote server according to a model of the electronic device.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
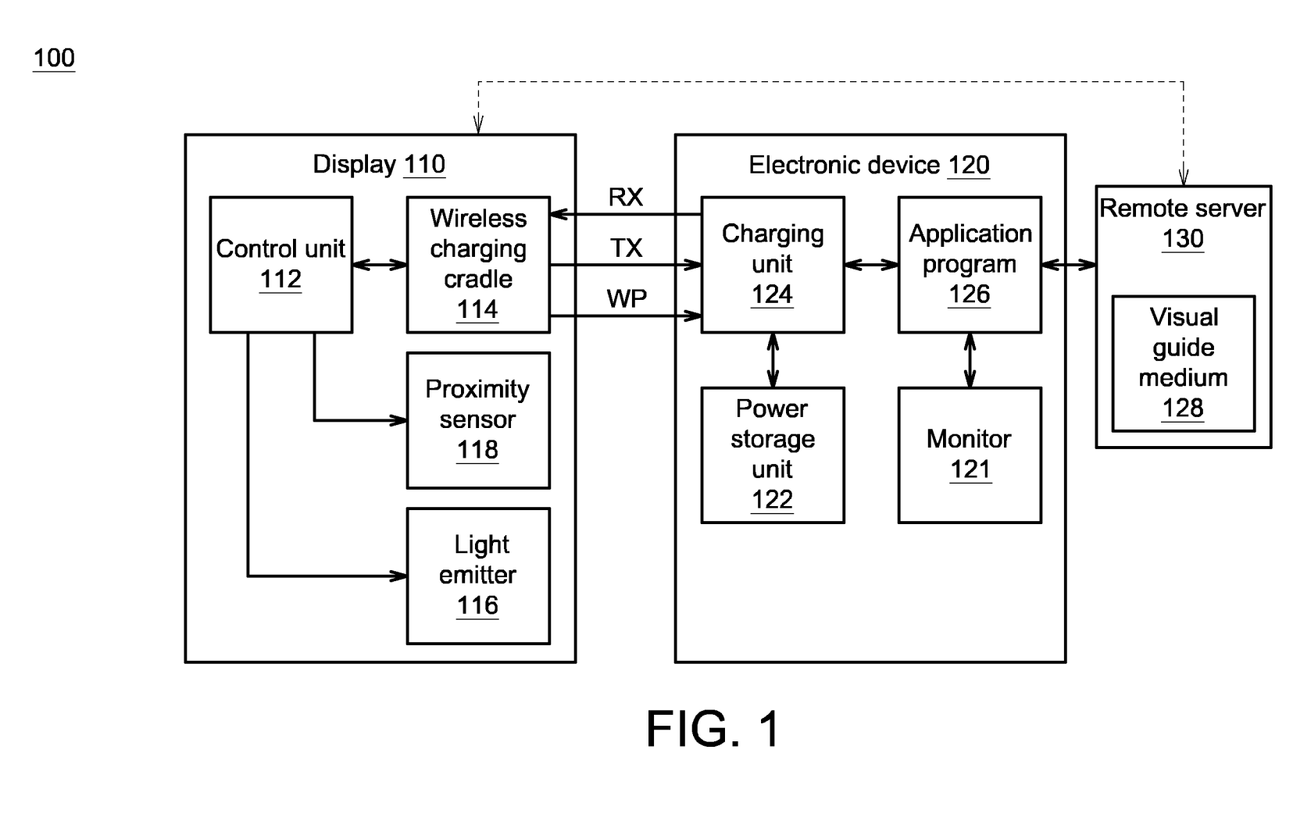
FIG. 1 is a block diagram of a wireless charging guide system according to an embodiment of the invention.
Figure 2:
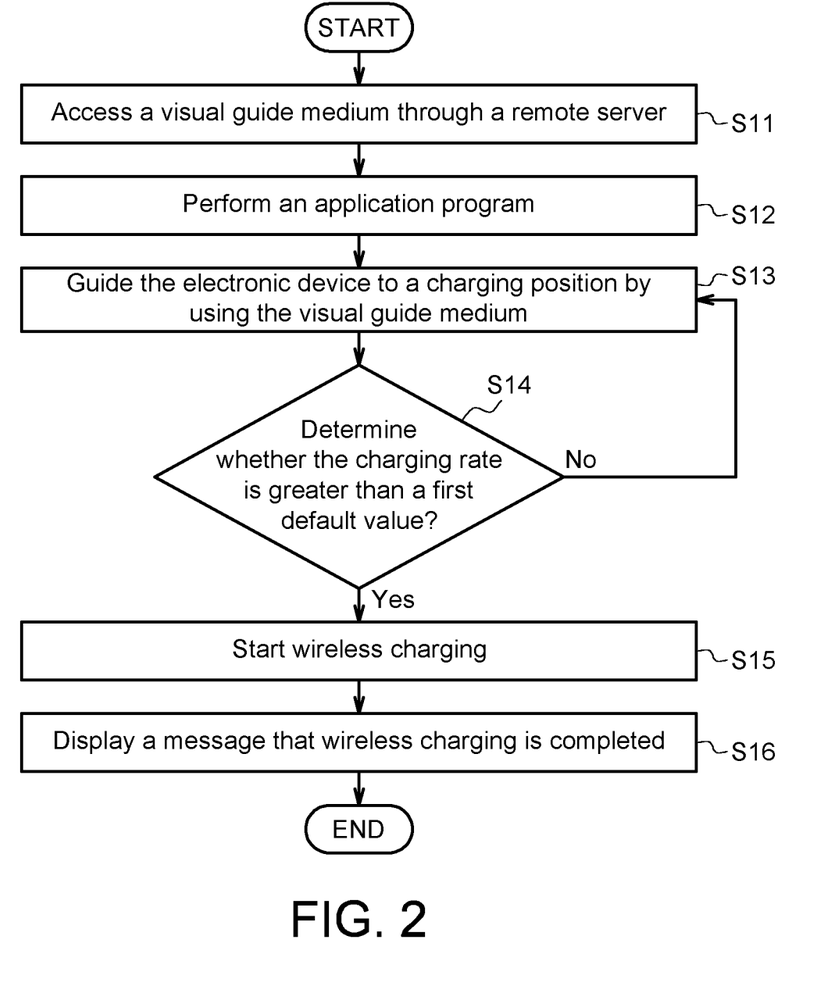
FIG. 2 is a flowchart of a wireless charging guide method according to an embodiment of the invention.

Refer to FIGS. 1 and 2. FIG. 1 is a block diagram of a wireless charging guide system 100 according to an embodiment of the invention. FIG. 2 is a flowchart of a wireless charging guide method according to an embodiment of the invention. As indicated in FIG. 1, the display 110 includes a control unit 112, a wireless charging cradle 114, a light emitter 116 and a proximity sensor 118. Apart from providing a display function, the display 110 can further detect an electronic device 120 using the sensing wire inside the wireless charging cradle 114 or using the proximity sensor 118 connected the control unit 112 to determine whether the user has placed the electronic device 120 at a correct charging position. Although the wireless charging guide system 100 is exemplified on the wireless charging cradle 114 of the display 110, the invention does not have particular restrictions regarding the type and external look of the wireless charging cradle 114.

In an embodiment, the proximity sensor 118 is disposed on the wireless charging cradle 114. The proximity sensor 118 can be realized by a capacitive sensor, an inductive sensor or a piezoelectric sensor. When the proximity sensor 118 detects that the distance from the electronic device 120 to the wireless charging cradle 114 is smaller than a set value, the light emitter 116 is activated to project a light spot or a set of lights on the top surface of the wireless charging cradle 114. The light spot can be projected at a charging center point 115 on the wireless charging cradle 114 to generate a visual guidance effect. The distance detecting mechanism of the proximity sensor 118 can determine the distance using a proximity sensor or according to the intensity of a signal. Besides, the set of lights can be projected at a corner of a predetermined charging block of the wireless charging cradle 114 to generate a visual guidance effect. Due to the diversity of the types and models of the wireless charging cradle 114, the charging positions of different types of the wireless charging cradle 114 are not necessary the same. Therefore, the wireless charging guide system 100 of the invention can access the visual guide medium 128 from the remote server 130 according to the model of the wireless charging cradle 114 and quickly locate the correct charging position through visual guidance.

As indicated in FIG. 1, the electronic device 120 includes a monitor 121, a power storage unit 122, a charging unit 124 and an application program 126. The electronic device 120 can be realized by a mobile phone, a notebook computer, a tablet PC, a projector, a camera, or a video camera having a wireless charging type power storage unit 122 (such as lithium battery). The electronic device 120 includes a back side and a front side. The charging unit 124 has a sensing coil disposed on the back side, and the monitor 121 is disposed on the front side. Therefore, the back side of the electronic device 120 must be close to the coil of the wireless charging cradle 114 such that wireless charging can be performed. The charging unit 124 and the wireless charging cradle 114 can communicate through transmission signals TX and RX, and can determine whether the electronic device 120 is located at the correct charging position according to the reading of the charging rate WP.

In an embodiment, the electronic device 120 can be connected to the remote server 130 through a public network and can download the application program 126 and access the visual guide medium 128 from the remote server 130. The visual guide medium 128 has an image pattern or a number, with which the user can conveniently place the electronic device 120 at the correct charging position. For example, the monitor 121 of the electronic device 120 displays the image pattern or the number related to the correct charging position. When the light emitter 116 projects a light spot on a mark of the image pattern or a particular number, this implies that the user has already placed the electronic device 120 at the correct charging position.

Due to the diversity of the types and models of the electronic device 120, the charging positions of different types of electronic device 120 are not necessary the same. Therefore, the wireless charging guide system 100 of the invention can access the visual guide medium 128 from the remote server 130 according to the model of the electronic device 120 and quickly locate the correct charging position through visual guidance. In another embodiment, the wireless charging guide system 100 of the invention can access the visual guide medium 128 according to the model of the electronic device 120 and the model of the wireless charging cradle 114 from the remote server 130 and quickly locate the correct charging position through visual guidance.

Moreover, the display 110 can further display the current position or charging state of the electronic device 120 through an on screen display (OSD) menu. After the electronic device 120 is guided to the charging position, the wireless charging cradle 114 can further inform the control unit 112 to turn off the light emitter 116 using the OSD menu or turn off the light emitter 116 directly. Meanwhile, the application program 126 starts to display a charging image pattern or an instruction text until the charging is completed.

Refer to FIG. 2. Detailed descriptions of each step of the wireless charging guide method are disclosed below using the wireless charging guide system 100 of FIG. 1 as an example. In step S11, a visual guide medium 128 is accessed from a remote server 130 by an electronic device 120, wherein the visual guide medium 128 is for guiding the electronic device 120 to locate a correct charging position. In step S12, when the electronic device 120 intends to perform wireless charging, an application program 126 is performed by the electronic device 120 to read an image pattern or a number and display the image pattern or the number on a monitor 121 of the electronic device 120 as the visual guide medium 128 which indicates the charging position. In step S13, the electronic device 120 is guided to the charging position using the visual guide medium 128. In step S14, whether the charging rate is larger than a first default value is determined. If the electronic device 120 is placed at a first position on the top surface of the wireless charging cradle 114, and the charging unit 124, with respect to the wireless charging cradle 114, has a charging rate WP larger than a first default value, the method proceeds to step S15 to perform wireless charging on the power storage unit 122. If no, this implies that the current position of the electronic device 120 is not the correct charging position, and the method returns to step S13 to continue to guide the electronic device 120 to the charging position. In step S16, during wireless charging, current charging state can be displayed on the OSD menu of the display 110 or on the monitor 121 of the electronic device 120; when the wireless charging finishes, a message that wireless charging is completed can also be displayed on the OSD menu of the display 110 or on the monitor 121 of the electronic device 120.

Detailed descriptions of the invention are disclosed below with a number of embodiments. However, the disclosed embodiments are for explanatory and exemplary purposes only, not for limiting the scope of protection of the invention.

First Embodiment

Figure 3A:
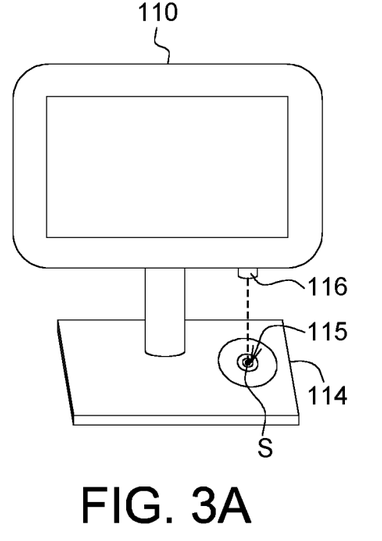
FIGS. 3A~3D are operation diagrams of a wireless charging guide system according to a first embodiment of the invention.
Figure 3B:
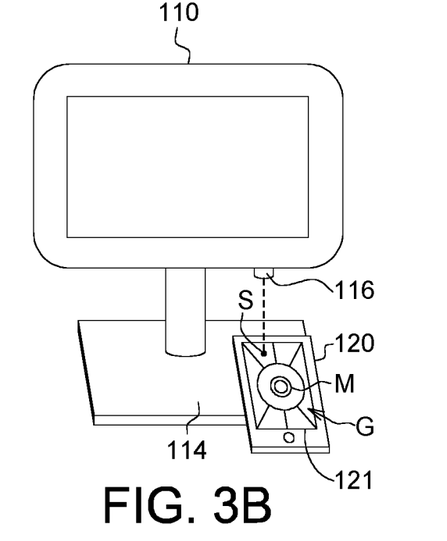

Refer to FIG. 1 and FIGS. 3A~3D. FIGS. 3A~3D are operation diagrams of a wireless charging guide system 100 according to a first embodiment of the invention. Firstly, as indicated in FIG. 3A, when the wireless charging cradle 114 is used for the first time, a light spot is projected on the top surface of the wireless charging cradle 114 by the light emitter 116, wherein the projection position of the light spot can be the position of the charging center point 115 on the wireless charging cradle 114 or other preferred position enabling the charging center point 115 to correspond to the sensing area of the electronic device 120. Next, as indicated in FIG. 3B, whether the electronic device 120 is close to the top surface of the wireless charging cradle 114 is determined by the proximity sensor 118 of the wireless charging cradle 114 or the charging unit 124 of the electronic device 120.

Figure 3C:
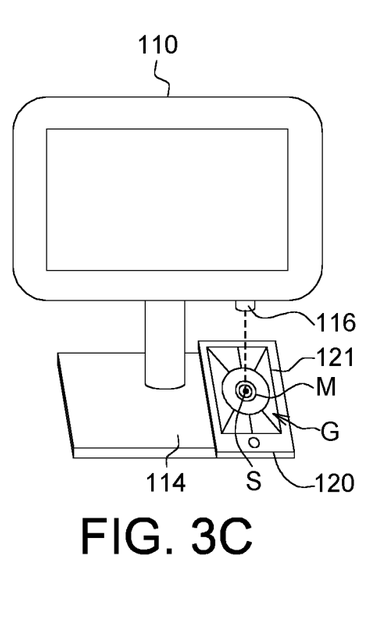
Figure 3D:
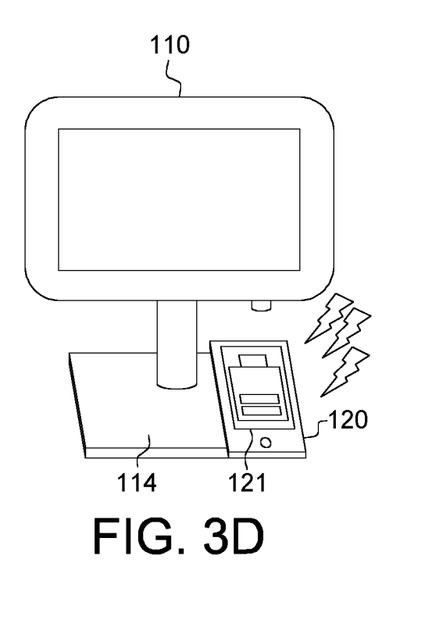

Meanwhile, the control unit 112 receives a signal from the proximity sensor 118 and turns on the light emitter 116, and the application program 126 of the electronic device 120 displays a image pattern G on the monitor 121. The image pattern G has a mark M which can be used to indicate the overlapping relationship between the charging unit 124 of the electronic device 120 and the charging center point 115. If the light spot S is not projected on the mark M of the monitor 121, this implies that the overlapping relationship between the charging unit 124 and the charging center point 115 is insufficient and the charging rate WP is insufficient either, and the application program 126 or the OSD menu can display the message that the electronic device 120 has not been moved to the correct charging position. As indicated in FIG. 3C, if the light spot S is projected on the mark M of the image pattern G on the monitor 121, and the charging unit 124, with respect to the wireless charging cradle 114, has a charging rate WP larger than a first default value, this implies that the electronic device 120 is placed at the first position of the wireless charging cradle 114. That is, when the electronic device 120 is moved to the correct charging position and the charging unit 124 is excited by the wireless charging cradle 114, the wireless charging cradle 114 starts to charge the power storage unit 122 through the charging unit 124. As indicated in FIG. 3D, when the charging unit 124 and the charging center point 115 have a large overlap rate, and the charging rate WP is larger than a first default value and wireless charging starts, the wireless charging cradle 114 informs the control unit 112 to turn off the light emitter 116, and the application program 126 or the OSD menu displays a charging pattern or an instruction text until the charging is completed.

In the above embodiment, the image pattern G guides the user to move the electronic device 120 to a position at which the charging unit 124 and the wireless charging cradle 114 have a large overlap rate. Since the said position may vary with the model of the electronic device 120, the image pattern G may vary in response to the mark or model of the electronic device 120. Therefore, the electronic device 120 can access the visual guide medium 128 from the remote server 130 according to the model of the electronic device 120. That is, since the remote server 130 has already stored a image pattern G corresponding to the model of the electronic device 120, the electronic device 120 can access the image pattern G corresponding to the charging position through the application program 126 and further display the image pattern G corresponding to the charging position on the monitor 121 to help the user quickly locate the correct charging position.

Second Embodiment

Figure 4A:
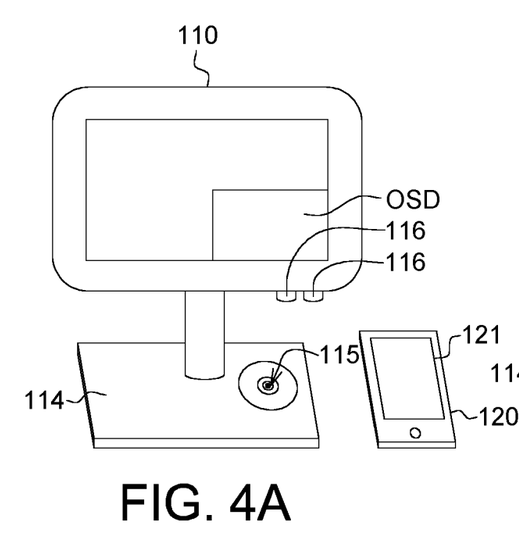
FIGS. 4A~4D are operation diagrams of a wireless charging guide system according to a second embodiment of the invention.
Figure 4B:
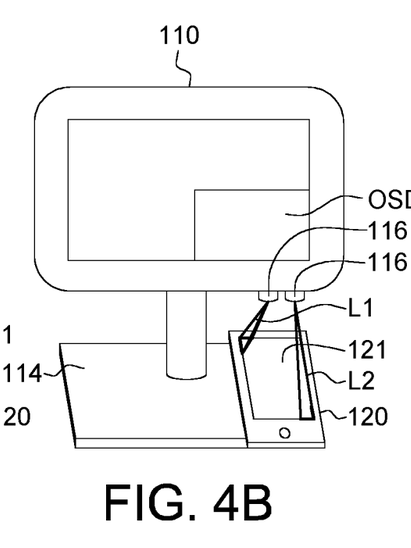

Refer to FIG. 1 and FIGS. 4A~4D. FIGS. 4A~4D are operation diagrams of a wireless charging guide system 100 according to a second embodiment of the invention. Firstly, as indicated in FIG. 4A, the wireless charging guide system 100 is a display 110, a wireless charging cradle 114 is disposed on the bottom of the display 110. When the wireless charging cradle 114 is used for the first time, an electronic device 120 is moved on the top surface of the wireless charging cradle 114 such that the charging unit 124 can sense the position of the charging center point 115. When the overlap rate between the charging unit 124 and the charging center point 115 is large and efficient charging can be achieved, the OSD on the display 110 or the electronic device 120 prompts the charging position to the user. Next, as indicated in FIG. 4B, two light spots or two lights L1 and L2 are projected at specific positions on the exterior of the electronic device 120 by the light emitter 116 through manual operation or software adjustment to label the charging position of the electronic device 120. The said specific positions can be set as the projection positions of two light spots or two lights L1 and L2 aligned with or adjacent to the corners at the top and the bottom of the monitor 121 of the electronic device 120 or the corners at the top and the bottom of a block; or the said specific positions can be set as the corners at the top and the bottom of the casing of the electronic device 120. The said light emitter 116 can be designed to be able to automatically adjust the projection positions of the lights L1 and L2. The display 110 can be connected to a computer (not illustrated) and can access a charging position from the remote server 130 through the Internet according to the model of the electronic device 120. Then, the light emitter 116 directly adjusts the projection positions of the lights according to the charging position. In another embodiment, if the wireless charging cradle 114 is a charging coil having a large size and a large charging area, the projection position of the light spot can be directly adjusted through manual operation or software adjustment and the electronic device 120 will be charged as long as the electronic device 120 is placed at the projection position.

Figure 4C:
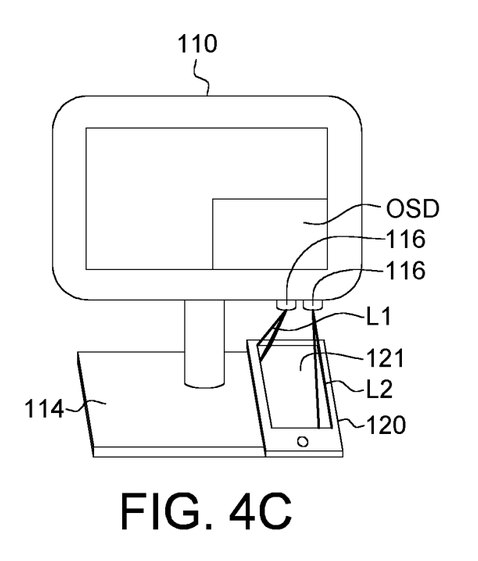
Figure 4D:
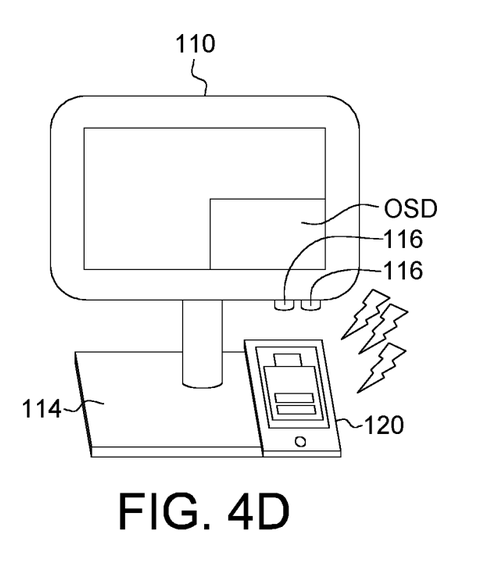

Refer to FIG. 4C. In practical applications, whether the electronic device 120 has been placed on the top surface of the wireless charging cradle 114 is determined by the proximity sensor 118 of the wireless charging cradle 114 or the charging unit 124 of the electronic device 120. Meanwhile, the control unit 112 receives a signal from the proximity sensor 118 and turns on the light emitter 116, and current state can be displayed on the application program 126 of the electronic device 120 or on the OSD menu of the display 110. If the two lights L1 and L2 are not projected on the corners at the top and the bottom of the monitor 121, the charging rate WP is smaller and therefore the application program 126 or the OSD menu can display the message that the electronic device 120 has not been moved to the correct charging position. As indicated in FIG. 4C, if the lights L1 and L2 are projected on the corners at the top and the bottom of the monitor 121 or on the corners at the top and the bottom of a block, and the charging unit 124, with respect to the wireless charging cradle 114, has a charging rate WP larger than a first default value, this implies that the electronic device 120 is placed at the first position of the wireless charging cradle 114. That is, when the electronic device 120 is moved to the correct charging position and the charging unit 124 is excited by the wireless charging cradle 114, the wireless charging cradle 114 starts to charge the power storage unit 122 through the charging unit 124. Under some circumstances (for example, the electronic device 120 does not have any electricity), the proximity sensor 118 cannot be operated. Since the projection positions of the lights L1 and L2 are ready aligned with the charging position, the user can turn on the light emitter 116 and move the electronic device 120 to be aligned with the light spot. As indicated in FIG. 4D, when the charging rate WP of the charging unit 124 is larger than a first default value and wireless charging starts, the wireless charging cradle 114 informs the control unit 112 to turn off the light emitter 116, and the application program 126 or the OSD menu displays a charging image pattern or an instruction text until the charging is completed.

In above embodiment, the electronic device 120 can access the visual guide medium 128 from the remote server 130 according to the model of the electronic device 120. That is, since the remote server 130 has already stored a image pattern corresponding to the model of the electronic device 120, the electronic device 120 can access the image pattern corresponding to the charging position through the application program 126 and further display the image pattern corresponding to the charging position on the monitor 121 to help the user quickly locate the correct charging position.

Third Embodiment

Figure 5A:
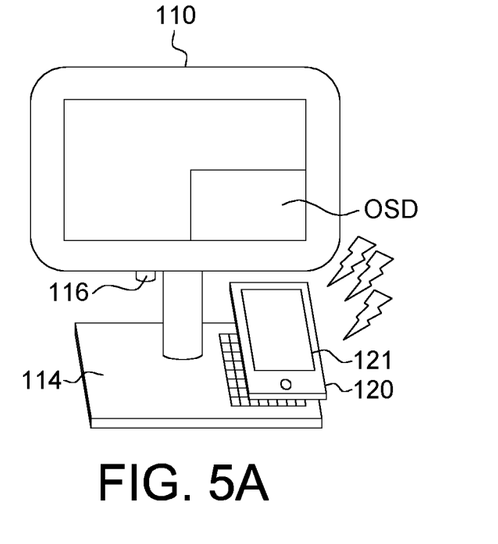
FIGS. 5A~5D are operation diagrams of a wireless charging guide system according to a third embodiment of the invention.
Figure 5B:
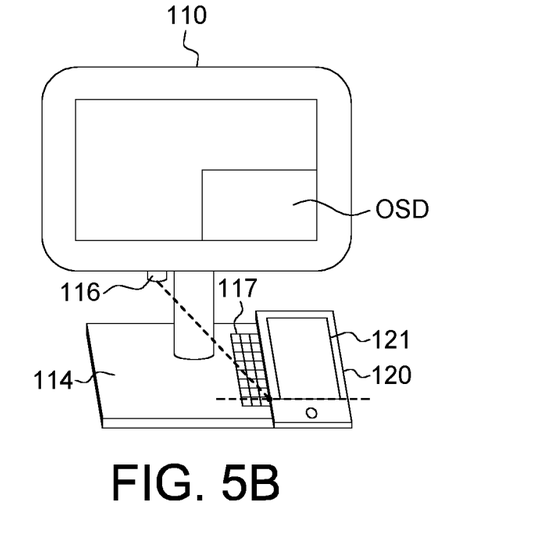
Figure 5C:
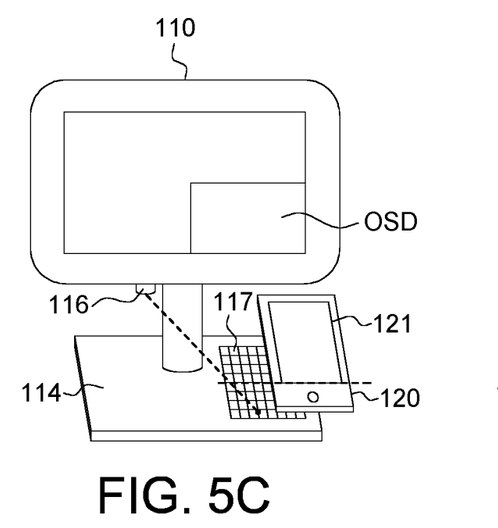
Figure 5D:
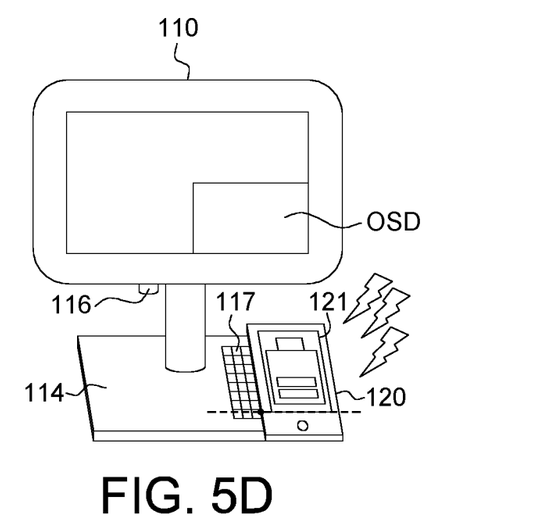

Refer to FIG. 1 and FIGS. 5A~5D. FIGS. 5A~5D are operation diagrams of a wireless charging guide system 100 according to a third embodiment of the invention. Firstly, as indicated in FIG. 5A, when the wireless charging cradle 114 is used for the first time, the electronic device 120 is placed on a grid chart 117 on the top surface of the wireless charging cradle 114. Next, as indicated in FIG. 5B, a light spot is projected on the grid chart 117 by the light emitter 116 according to the position information, wherein the projection position of the light spot is aligned with a straight line on the surface of the monitor 121 of the electronic device 120 and a predetermined grid line of the grid chart 117. Then, as indicated in FIG. 5B, whether the electronic device 120 has been placed on the top surface of the wireless charging cradle 114 is determined by the proximity sensor 118 of the wireless charging cradle 114 or the charging unit 124 of the electronic device 120. Meanwhile, the control unit 112 receives a signal from the proximity sensor 118 and turns on the light emitter 116, and the application program 126 of the electronic device 120 or the OSD menu can display the current state. When a straight line on the surface of the monitor 121 of the electronic device 120 is not aligned with the projection position of the light spot and the position of the predetermined grid line of the grid chart 117, the charging rate WP is insufficient, and the application program 126 or the OSD menu can display the message that the electronic device 120 has not been moved to the correct charging position. As indicated in FIG. 5C, when the straight line on the surface of the monitor 121 of the electronic device 120 is aligned with the projection position of the light spot and the predetermined grid line of the grid chart 117, and the charging unit 124, with respect to the wireless charging cradle 114, has a charging rate WP larger than a first default value, this implies that the electronic device 120 is placed at the first position of the wireless charging cradle 114. That is, when the electronic device 120 is moved to the correct charging position and the charging unit 124 is excited by the wireless charging cradle 114, the wireless charging cradle 114 starts to charge the power storage unit 122 through the charging unit 124. As indicated in FIG. 5D, when the charging rate WP of the charging unit 124 is larger than a first default value or the wireless charging cradle 114, with respect to the charging unit 124, has a discharge rate larger than a second default value, and wireless charging starts, the wireless charging cradle 114 informs the control unit 112 to turn off the light emitter 116, and the application program 126 or the OSD menu displays a charging image pattern or an instruction text until the charging is completed.

In above embodiment, the electronic device 120 can access the visual guide medium 128 from the remote server 130 according to the model of the electronic device 120. That is, since the remote server 130 has already stored an alignment position corresponding to the model of the electronic device 120, the electronic device 120 can obtain an alignment position corresponding to the charging position through the application program 126 and display the alignment position corresponding to the charging position on the monitor 121 to help the user quickly locate the correct charging position.

In above embodiments, when the power of the electronic device 120 is insufficient or the application program 126 cannot be used, through the guidance of the light emitter 116, the user still can guide the electronic device 120 to the correct charging position according to the current state displayed on the OSD menu. After the charging starts and the electronic device 120 has sufficient power or the application program 126 can be used, the electronic device 120 can be charged through the above guidance.

Fourth Embodiment

Figure 6A:
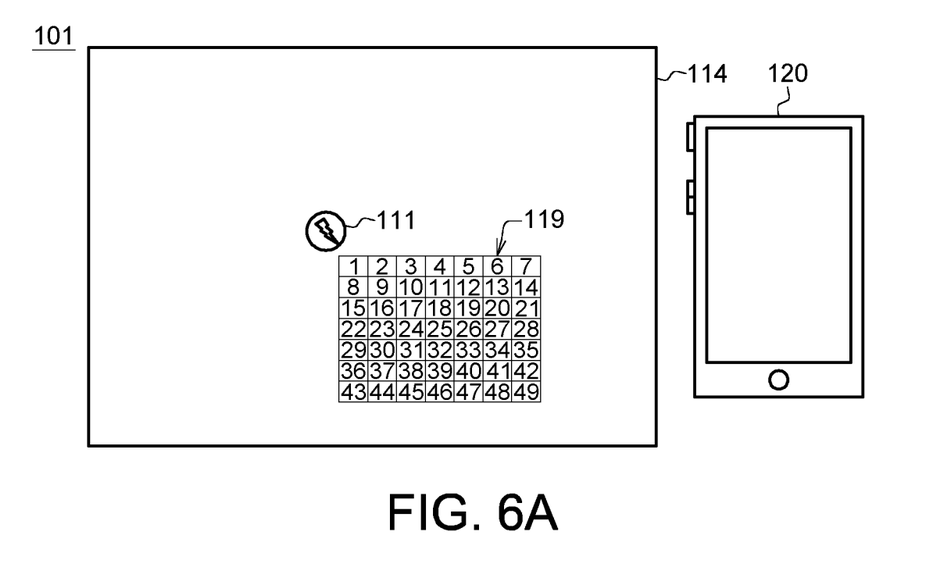
FIGS. 6A~6B are operation diagrams of a wireless charging guide device according to a fourth embodiment of the invention.
Figure 6B:
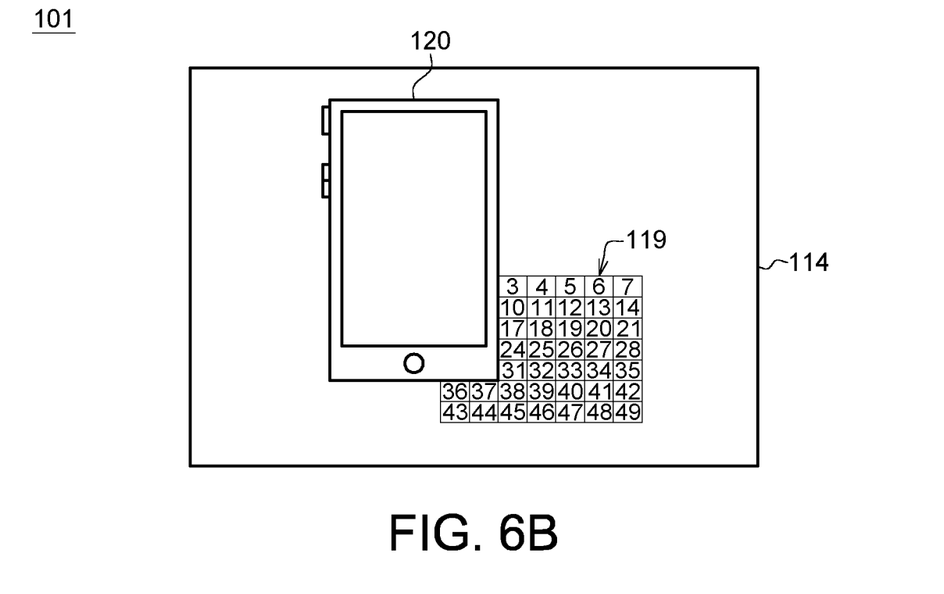

Refer to FIG. 1 and FIGS. 6A~6B. FIGS. 6A~6B are operation diagrams of a wireless charging guide device 101 according to a fourth embodiment of the invention. The wireless charging guide device 101 has a set of numbers 119 disposed on the top surface of the wireless charging cradle 114. The set of numbers 119, which can be realized by numeric numbers or recognizable marks such as symbols or texts, are located inside the grid chart. The set of numbers 119 is for guiding the electronic device 120 to be placed at the charging position 111 of the wireless charging cradle 114.

As indicated in FIG. 6A, when the wireless charging cradle 114 is used for the first time, the electronic device 120 is placed on the wireless charging cradle 114 and is moved, and whether the charging unit, with respect to the wireless charging cradle 114, has a charging rate WP larger than a first default value is determined. If the charging rate WP is insufficient, this implies that the electronic device 120 has not been moved to the correct charging position 111. If the charging rate WP is larger than a first default value, this implies that the electronic device 120 is already at the correct charging position 111, and manual calibration is completed. As indicated in FIG. 6B, the area of the set of numbers being shielded by the electronic device 120 defines a first position, such as the bottom right corner of the electronic device 120. The user only needs to remember a number corresponding to the bottom right corner of the electronic device 120, and in the next time of charging, the user can directly align the bottom right corner of the electronic device 120 with the corresponding number, and the calibration which would otherwise be performed each time before charging starts can thus be omitted.

In above embodiments, apart from the manual calibration, the electronic device 120 can further access the visual guide medium 128 from the remote server 130 according to the model of the electronic device 120. That is, since the remote server 130 has already stored position information corresponding to the model of the electronic device 120, the electronic device 120 can obtain position information corresponding to the first position through the application program 126, and further display a corresponding image pattern or number of the position information on the monitor 121. Therefore, the user can directly align the bottom right corner of the electronic device 120 with the corresponding number, and start charging immediately. Furthermore, the user can decide whether to upload the positioning number to the remote server 130 for the user of the same model of the electronic device 120 to obtain the positioning number from the remote server 130.

According to the wireless charging guide system, the guide method and the guide device disclosed in above embodiments of the invention, the electronic device is precisely aligned with the charging position of the wireless charging cradle through visual guidance, such that the correct charging position can be quickly located and charging efficiency can be increased. Furthermore, the electronic device can obtain position information corresponding to the charging position from the remote server using an application program, and can further display a corresponding image pattern or number of the position information on the monitor to help the user quickly locate the correct charging position.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless charging guide system, comprising:
    a display providing a display function, the display comprising a wireless charging cradle for supporting the display, the wireless charging cradle comprising a top surface;
    an electronic device, comprising a power storage unit and a charging unit, wherein the electronic device is movable to be placed at different positions on the top surface; and
    a visual guide medium, comprising position information for guiding the electronic device, wherein when the electronic device is guided to be placed at a first position on the top surface of the wireless charging cradle, the charging unit, with respect to the wireless charging cradle, has a charging rate larger than a first default value and starts to charge the power storage unit, and the position information is accessed from a remote server according to a model of the electronic device,
    wherein the electronic device obtains the position information through the remote server to be placed at a charging position.

2. The guide system according to claim 1, wherein the position information of the visual guide medium comprises an image pattern having a mark, the electronic device comprises a monitor for displaying the image pattern, and the guide system further comprises:
    a light emitter for projecting a light spot on the top surface of the wireless charging cradle, wherein when the light spot is projected on the mark of the image pattern on the monitor and the electronic device is placed on the top surface of the wireless charging cradle, the electronic device is placed at the first position of the wireless charging cradle.

3. The guide system according to claim 1, comprising:
    a light emitter for projecting at least one light spot on the top surface of the wireless charging cradle according to the position information, wherein when the projection position of the at least one light spot is aligned with a specific position on a surface of the electronic device, the electronic device is placed at the first position on the top surface of the wireless charging cradle.

4. The guide system according to claim 3, wherein the visual guide medium comprises a grid chart disposed on the top surface of the wireless charging cradle, the specific position is a straight line on the surface of the electronic device, and when the projection position of the light spot is aligned with the position of the straight line and a predetermined grid line of the grid chart, the electronic device is placed at the first position of the wireless charging cradle.

5. The guide system according to claim 3, wherein the light emitter projects at least two light spots on the top surface of the wireless charging cradle, and when the at least two light spots are respectively adjacent to two corners of the electronic device, the electronic device is placed at the first position on the top surface of the wireless charging cradle.

6. The guide system according to claim 1, wherein the electronic device accesses the visual guide medium from the remote server according to the model of the electronic device and a model of the wireless charging cradle.

7. The guide system according to claim 1, wherein the visual guide medium comprises a set of numbers on the top surface of the wireless charging cradle, and the area of the set of numbers being shielded by the electronic device defines the first position.

8. The guide system according to claim 7, wherein the electronic device comprises a monitor for displaying a number which is contained in the set of numbers and corresponding to the first position.

9. The guide system according to claim 2, wherein the wireless charging cradle further comprises a proximity sensor, when the proximity sensor detects that a distance from the electronic device to the wireless charging cradle is smaller than a set value, the light emitter is activated to project the light spot on the top surface of the wireless charging cradle.

10. The guide system according to claim 9, wherein the display has an OSD menu for turning off the light emitter.

11. The guide system according to claim 1, wherein the display has an OSD menu for guiding the electronic device to correct charging position.

12. The guide system according to claim 2, wherein the electronic device comprises an application program, which accesses the image pattern from the remote server according to a model of the electronic device.

13. The guide system according to claim 1, wherein, during wireless charging, the display displays current charging state.

14. A wireless charging guide method, comprising:
    moving an electronic device at a first position on a top surface of a wireless charging cradle of a display using a visual guide medium, the wireless charging cradle supporting the display, the display providing a display function, the electronic device comprising a power storage unit and a charging unit, wherein the visual guide medium comprises position information; and
    charging the power storage unit when a charging unit, with respect to the wireless charging cradle, has a charging rate larger than a first default value, wherein the position information is accessed from a remote server according to a model of the electronic device,
    wherein the electronic device obtains the position information through the remote server to be placed at a charging position.

15. The guide method according to claim 14, wherein the position information of the visual guide medium comprises an image pattern having a mark, the electronic device comprises a monitor for displaying the image pattern, and the guide method further comprises:
    projecting a light spot on a top surface of the wireless charging cradle wherein when the light spot is projected on the mark of the image pattern on the monitor and the electronic device is placed on the top surface of the wireless charging cradle, the electronic device is placed on the first position of the wireless charging cradle.

16. The guide method according to claim 14, further comprising:

projecting at least one light spot on the top surface of the wireless charging cradle according to the position information, wherein when the projection position of the at least one light spot is aligned with a specific position of the electronic device, the electronic device is placed on the first position of the wireless charging cradle.

17. The guide method according to claim 14, wherein the electronic device accesses the visual guide medium from the remote server according to the model of the electronic device and a model of the wireless charging cradle.

* * * * *